United States Patent
Bae

(10) Patent No.: US 9,912,198 B2
(45) Date of Patent: Mar. 6, 2018

(54) WIRELESS POWER TRANSMISSION DEVICE

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 95 days.

(21) Appl. No.: 14/910,482

(22) PCT Filed: Aug. 6, 2014

(86) PCT No.: PCT/KR2014/007279
§ 371 (c)(1),
(2) Date: Feb. 5, 2016

(87) PCT Pub. No.: WO2015/020432
PCT Pub. Date: Feb. 12, 2015

(65) Prior Publication Data
US 2016/0181870 A1    Jun. 23, 2016

(30) Foreign Application Priority Data
Aug. 7, 2013   (KR) .................. 10-2013-0093852

(51) Int. Cl.
*H02J 17/00*   (2006.01)
*H02J 50/12*   (2016.01)
(Continued)

(52) U.S. Cl.
CPC .............. *H02J 50/12* (2016.02); *H02J 5/005* (2013.01); *H02J 7/025* (2013.01); *H02J 17/00* (2013.01);
(Continued)

(58) Field of Classification Search
CPC .. H02J 50/10; H02J 50/40; H02J 5/005; H02J 17/00
See application file for complete search history.

(56) References Cited

U.S. PATENT DOCUMENTS

| | | | |
|---|---|---|---|
| 8,143,856 B2* | 3/2012 | Andrea | H02J 7/022 320/109 |
| 8,482,159 B2* | 7/2013 | Shimokawa | H01Q 7/00 307/104 |

(Continued)

FOREIGN PATENT DOCUMENTS

| | | |
|---|---|---|
| CN | 102122848 A | 7/2011 |
| CN | 102149566 A | 8/2011 |

(Continued)

*Primary Examiner* — Jung Kim
(74) *Attorney, Agent, or Firm* — Birch, Stewart, Kolasch & Birch, LLP

(57) ABSTRACT

A wireless power transmission device for wirelessly transmitting power to a wireless power reception device, according to one embodiment of the present invention, comprises: a first transmission coil for transmitting power to the wireless power reception device through a magnetic field; and a second transmission coil for transmitting power to the wireless power reception device through a magnetic field and arranged on the inner side of the first transmission coil, wherein the wireless power transmission device transmits power to the wireless power reception device through one coil between the first transmission coil and the second transmission coil on the basis of a coupling state between the wireless power transmission device and the wireless power reception device.

7 Claims, 12 Drawing Sheets

(51) Int. Cl.
  *H02J 50/80* (2016.01)
  *H02J 7/02* (2016.01)
  *H02J 5/00* (2016.01)
  *H02J 50/10* (2016.01)
  *H02J 50/40* (2016.01)

(52) U.S. Cl.
  CPC .............. *H02J 50/10* (2016.02); *H02J 50/40* (2016.02); *H02J 50/80* (2016.02)

(56) References Cited

U.S. PATENT DOCUMENTS

| | | | |
|---|---|---|---|
| 9,118,203 B2* | 8/2015 | Davis | H02J 5/005 |
| 9,236,757 B2* | 1/2016 | Walley | H02J 5/005 |
| 2011/0169337 A1* | 7/2011 | Kozakai | H02J 5/005 |
| | | | 307/104 |
| 2011/0241437 A1 | 10/2011 | Kanno | |
| 2012/0212074 A1 | 8/2012 | Uchida | |
| 2012/0242164 A1* | 9/2012 | Teggatz | H01F 38/14 |
| | | | 307/104 |
| 2012/0248892 A1 | 10/2012 | Covic et al. | |
| 2013/0015720 A1 | 1/2013 | Shimokawa et al. | |
| 2014/0111021 A1* | 4/2014 | Nakamura | B60M 7/003 |
| | | | 307/104 |
| 2014/0191586 A1 | 7/2014 | Ichikawa | |
| 2014/0225454 A1 | 8/2014 | Ichikawa | |
| 2015/0123679 A1* | 5/2015 | Kuyvenhoven | G06K 19/0717 |
| | | | 324/652 |

FOREIGN PATENT DOCUMENTS

| | | |
|---|---|---|
| CN | 102449711 A | 5/2012 |
| CN | 103023159 A | 4/2013 |
| KR | 10-2013-0024757 A | 3/2013 |
| WO | WO 2011/099071 A1 | 8/2011 |
| WO | WO 2013/042229 A1 | 3/2013 |
| WO | WO 2013/054399 A1 | 4/2013 |

* cited by examiner

[FIG. 1]
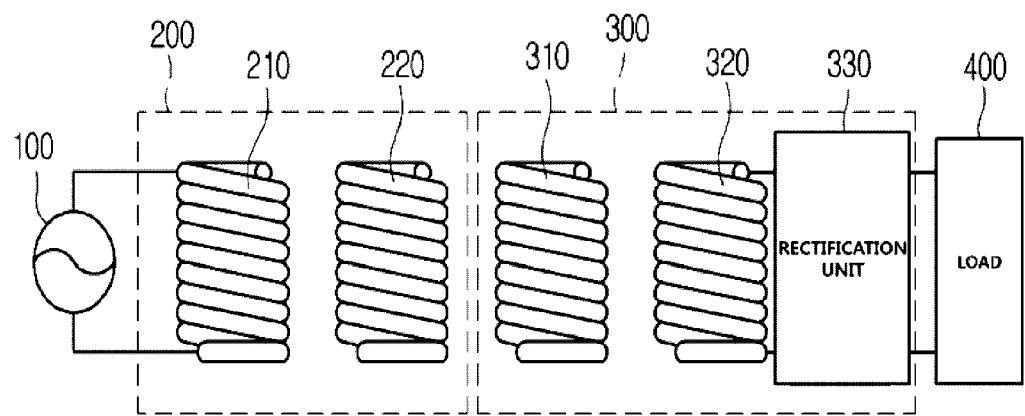

[FIG. 2]
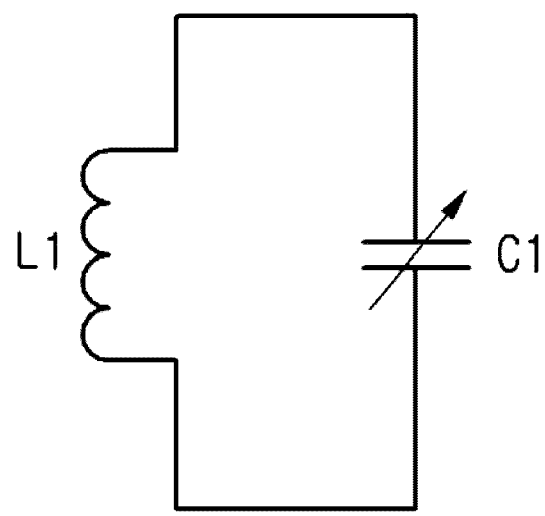

[FIG. 3]
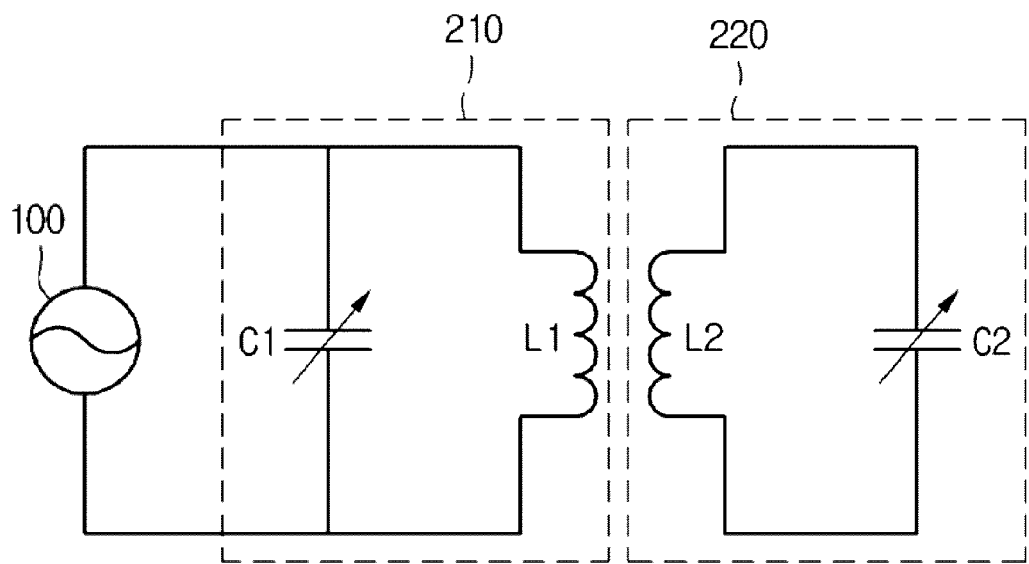

[FIG. 4]
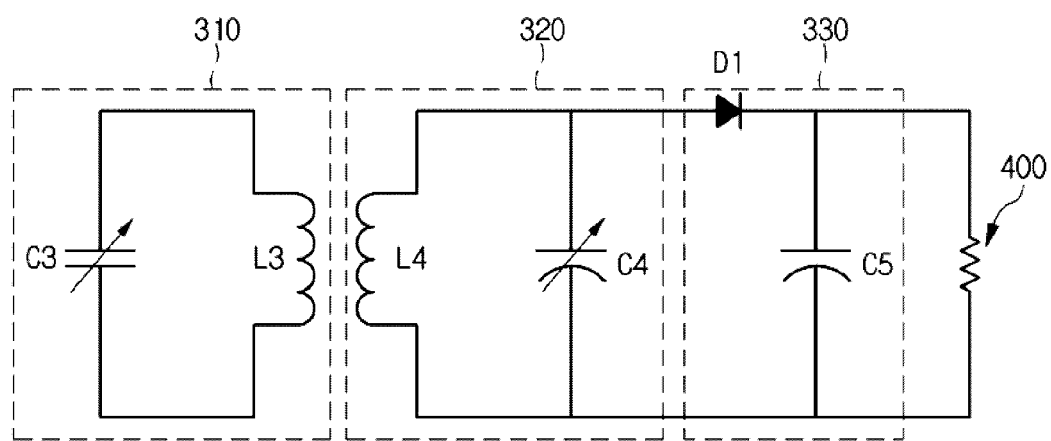

[FIG. 5]
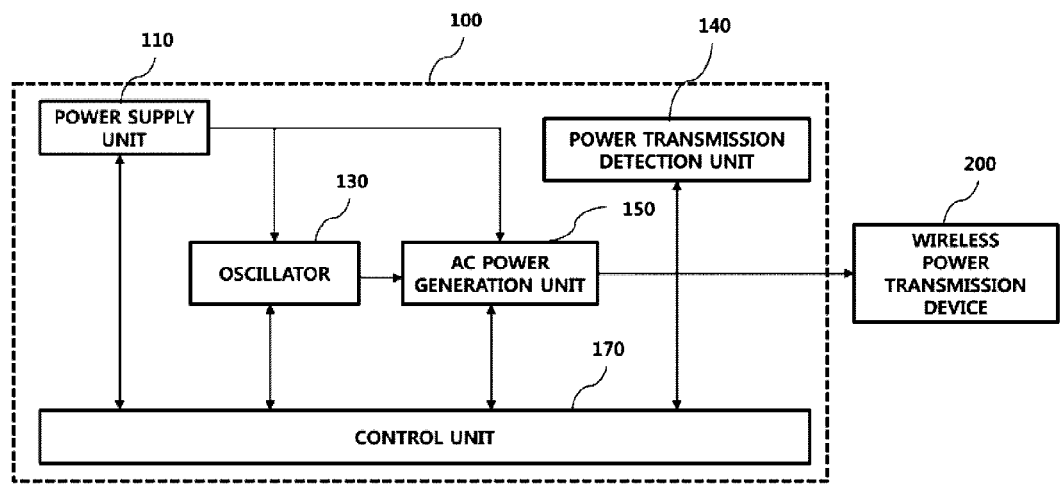

[FIG. 6]
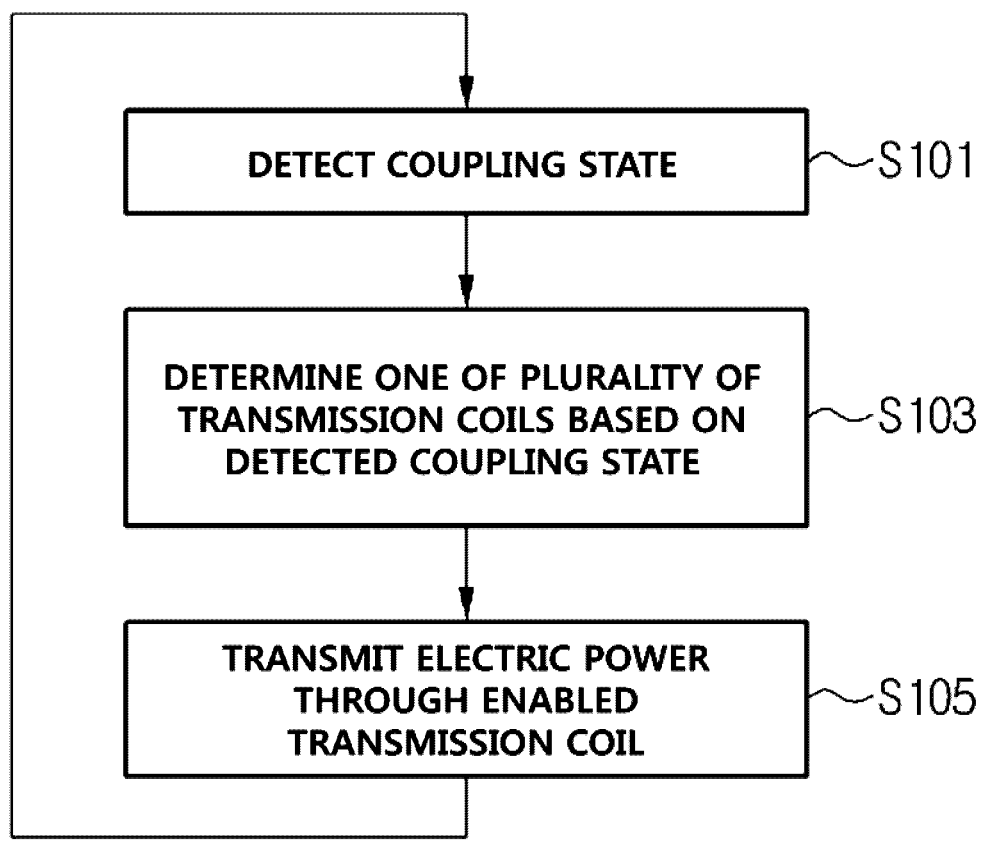

[FIG. 7]
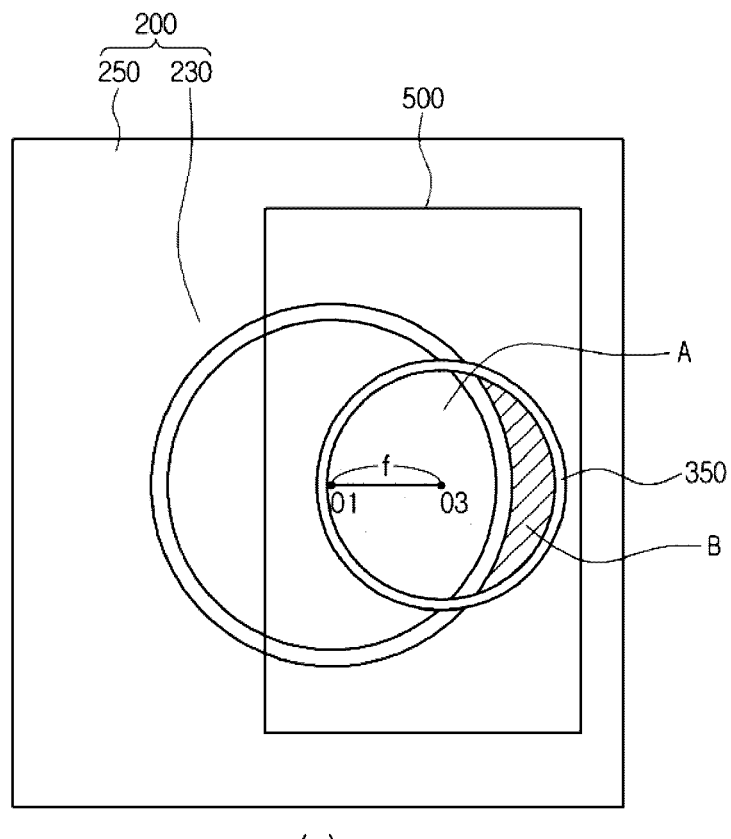
(a)
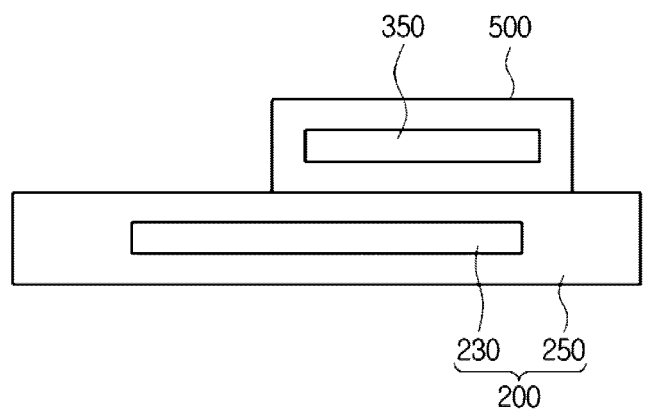
(b)

[FIG. 8]

[FIG. 9]
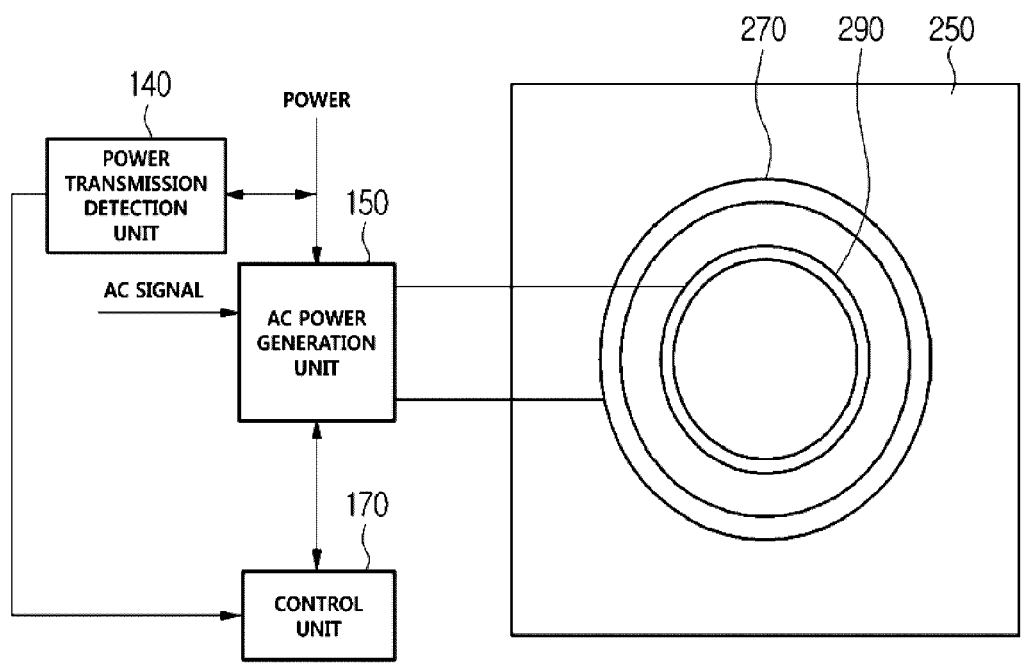

[FIG. 10]
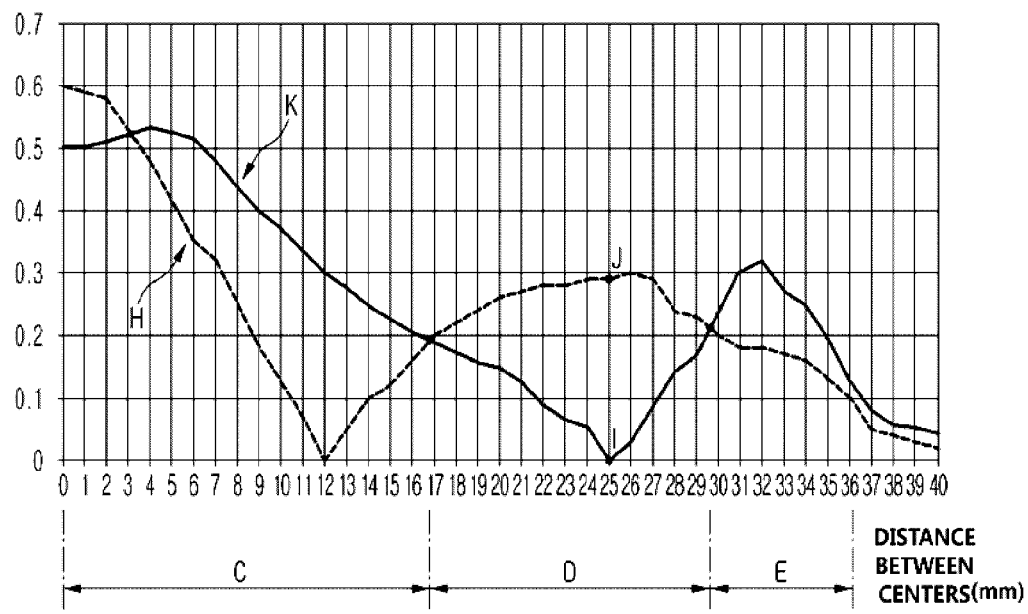

[FIG. 11]
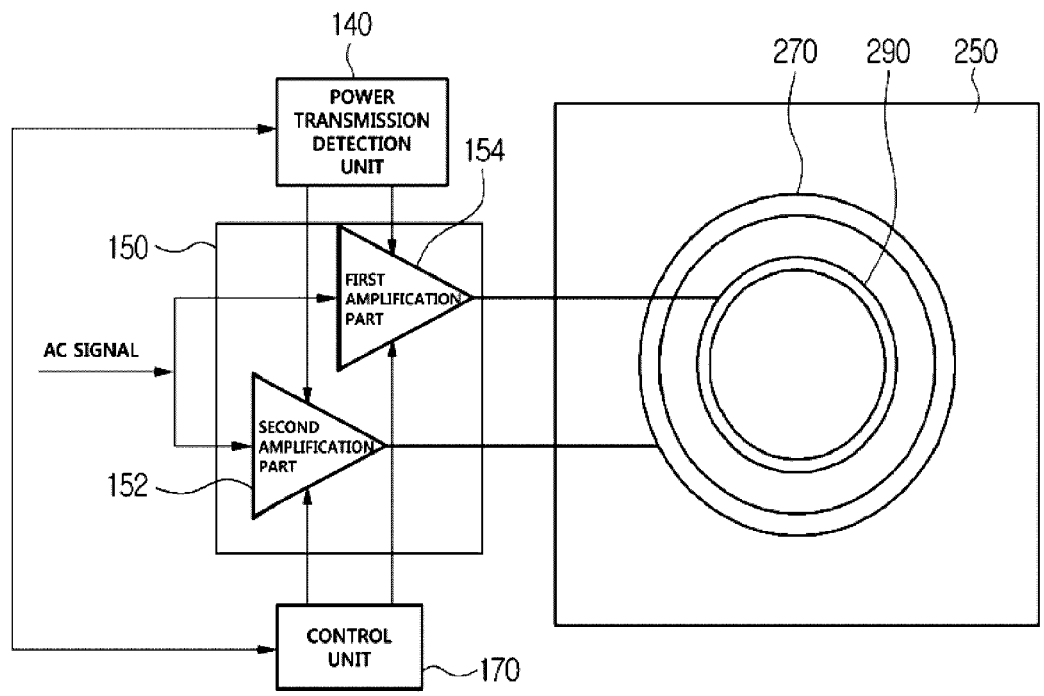

[FIG. 12]
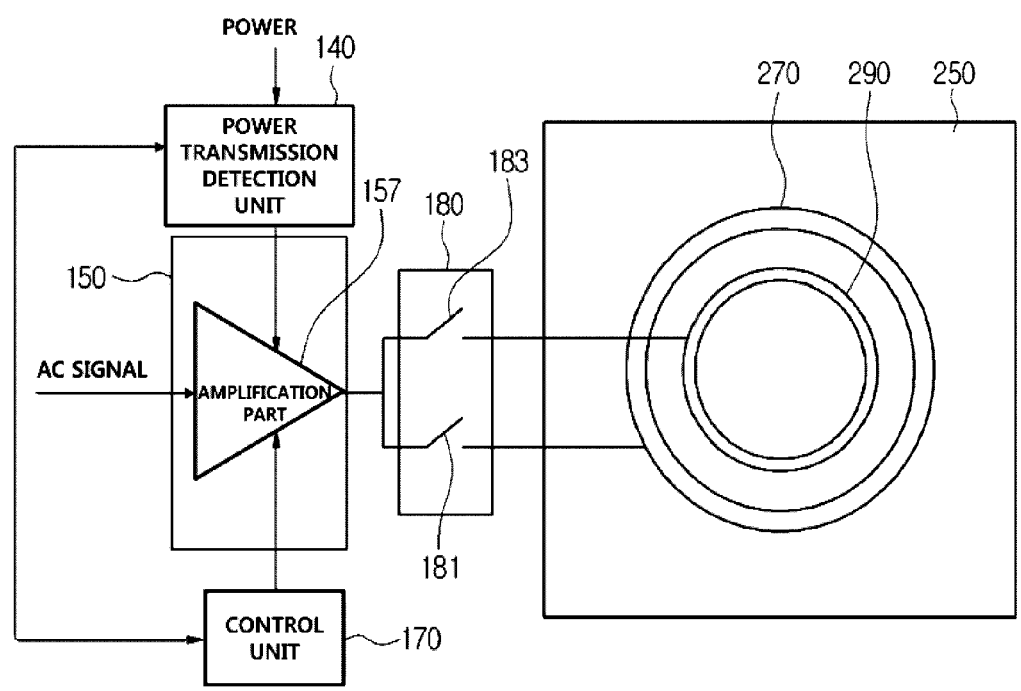

WIRELESS POWER TRANSMISSION DEVICE

CROSS REFERENCE TO RELATED APPLICATIONS

This application is the National Phase of PCT International Application No. PCT/KR2014/007279, filed on Aug. 6, 2014, which claims priority under 35 U.S.C. 119(a) to Korean application No. 10-2013-0093852 filed on Aug. 7, 2013 which are hereby expressly incorporated by reference into the present application.

TECHNICAL FIELD

The present invention relates to a wireless power transmission technology.

BACKGROUND ART

For wireless power transmission or wireless energy transfer technologies for transferring electric energy to desired devices in a wireless manner, electric motors or transformers using the principle of electromagnetic induction began to be used in the 1800s. Since then, methods of emitting radio waves or electromagnetic waves such as laser to transfer electric energy have been attempted.

Electric toothbrushes and some wireless shavers that are commonly used are also charged using the principle of electromagnetic induction. Electromagnetic induction refers to a phenomenon in which a current flow by the voltage induced when a magnetic field is changed around a conductor.

Electromagnetic induction technology has been rapidly commercialized in association with small devices, but has a disadvantage in that power can only be transmitted short distance. To date, the only method of transferring energy in a wireless manner besides electromagnetic induction technology is a long-distance transmission technology using resonance and short-wave radio frequencies.

In recent years, among these wireless power transmission technologies, a method of transferring energy using resonance is frequently used. In wireless power transmission systems using resonance, electric power is transferred through transmission-side and reception-side coils in a wireless manner, and therefore a user can easily charge electronic devices such as portable devices.

In particular, an electronic device is placed on a wireless power transmission device to be charged in a wireless manner, and the wireless power transmission device conventionally transmits electric power through only a single transmission coil included therein. For this reason, since the position of a reception coil included in the electronic device is always different, power transmission efficiency may be lowered.

That is, when only the single transmission coil included in the wireless power transmission device, a region in which magnetic flux is cancelled out may be present depending on the position of the reception coil, in which case power transmission may not be smoothly performed.

DISCLOSURE

Technical Problem

An object of the present invention is to provide a wireless power transmission device capable of maximizing power transmission efficiency using a plurality of transmission coils even if a position of a reception coil included in a wireless power reception device is changed.

Technical Solution

In accordance with an aspect of the present invention, a wireless power transmission device for transmitting electric power to a wireless power reception device in a wireless manner, includes a first transmission coil configured to transmit electric power to the wireless power reception device through a magnetic field, and a second transmission cowl configured to transmit electric power to the wireless power reception device through a magnetic field, and disposed inside the first transmission coil, wherein the wireless power transmission device transmits electric power to the wireless power reception device though one of the first and second transmission coils, based on a coupling state between the wireless power transmission device and the wireless power reception device.

The wireless power transmission device may compare magnetic coupling between the first transmission coil and a reception coil provided in the wireless power reception device with magnetic coupling between the second transmission coil and the reception coil, so as to transmit electric power to the wireless power reception device through a coil for allowing the magnetic coupling to be better.

The wireless power transmission device may further include a power transmission detection unit configured to detect a coupling state between the wireless power transmission device and the wireless power reception device, and the power transmission detection unit may measure a current flowing in the wireless power transmission device to check the coupling state.

The wireless power transmission device may alternately operate the first and second transmission coils to measure the current flowing in the wireless power transmission device.

The wireless power transmission device may transmit electric power to the wireless power reception device through a coil, in which the measured current has a higher intensity, from among the first and second transmission coils.

The wireless power transmission device may further include an AC power generation unit configured to generate AC power using an AC signal and DC power, and the AC power generation unit may include a first amplification part for outputting the generated AC power to the first transmission coil, and a second amplification part for outputting the generated AC power to the second transmission coil.

The wireless power transmission device may compare a current measured when the first amplification part is enabled and the second amplification part is disabled, with a current measured when the first amplification part is disabled and the second amplification part is enabled, in order to determine one of the first and second transmission coils as a coil for power transmission.

The coupling state may be indicated by a coupling coefficient between the first transmission coil and a reception coil provided in the wireless power reception device, or a coupling coefficient between the second transmission coil and a reception coil provided in the wireless power reception device.

Sizes of the first and second transmission coils may be set such that a point, at which the coupling coefficient between the first transmission coil and the reception coil of the wireless power reception device is minimized, coincides with a point at which the coupling coefficient between the second transmission coil and the reception coil is maximized.

DESCRIPTION OF DRAWINGS

FIG. 1 is a diagram for explaining a wireless power transmission system according to an embodiment of the present invention.

FIG. 2 is a diagram illustrating an equivalent circuit of a transmission induction coil according to the embodiment of the present invention.

FIG. 3 is a diagram illustrating equivalent circuits of a power supply device and a wireless power transmission device according to the embodiment of the present invention.

FIG. 4 is a diagram illustrating an equivalent circuit of a wireless power reception device according to the embodiment of the present invention.

FIG. 5 is a diagram illustrating a configuration of the power supply device according to the embodiment of the present invention.

FIG. 6 is a flowchart illustrating a method of transmitting electric power using a wireless power transmission device according to an embodiment of the present invention.

FIG. 7 is a diagram for explaining, when a wireless power transmission device includes a single transmission coil, arrangement between the transmission coil and a reception coil.

FIG. 8 is a diagram illustrating the result of measurement of a coupling coefficient depending on a distance between centers of the transmission and reception coils.

FIG. 9 is a diagram illustrating a configuration of the wireless power transmission device provided with two transmission coils according to an embodiment of the present invention.

FIG. 10 is a diagram for explaining a variation in coupling coefficient depending on a distance between centers of a first transmission coil and a reception coil and a distance between centers of a second transmission coil and the reception coil, according to the embodiment of the present invention.

FIG. 11 is a diagram for explaining a process of determining a transmission coil, which serves to transmit electric power to a reception coil, through current measurement, according to an example of the present invention.

FIG. 12 is a diagram for explaining a process of determining a transmission coil, which serves to transmit electric power to a reception coil, through current measurement, according to an alternative example of the present invention.

BEST MODE

Reference will now be made in detail to the exemplary embodiments of the present invention, examples of which are illustrated in the accompanying drawings, such that the exemplary embodiments may be easily realized by a person of ordinary skill in the art.

FIG. 1 is a diagram for explaining a wireless power transmission system according to an embodiment of the present invention.

Referring to FIG. 1, the wireless power transmission system may include a power supply device 100, a wireless power transmission device 200, a wireless power reception device 300, and a load 400.

In an example, the power supply device 100 may be included in the wireless power transmission device 200.

The wireless power transmission device 200 may include a transmission induction coil 210 and a transmission resonance coil 220.

The wireless power reception device 300 may include a reception resonance coil 310, a reception induction coil 320 and a rectification unit 330.

Both ends of the power supply device 100 are connected to both ends of the transmission induction coil 210.

The transmission resonance coil 220 may be disposed so as to be spaced apart from the transmission induction coil 210 by a certain distance.

The reception resonance coil 310 may be disposed so as to be spaced apart from the reception induction coil 320 by a certain distance.

Both ends of the reception induction coil 320 may be connected to both ends of the rectification unit 330, and the load 400 may be connected to both ends of the rectification unit 330. In an example, the load 400 may be included in the wireless power reception device 300.

Electric power generated by the power supply device 100 is transferred to the wireless power transmission device 200. The electric power transferred to the wireless power transmission device 200 may be transferred to the wireless power reception device 300, which resonates with the wireless power transmission device 200 due to resonance phenomenon, i.e. a resonant frequency value may be transferred to the wireless power reception device 300.

Hereinafter, a power transmission process will be described in more detail.

The power supply device 100 may generate AC power having a predetermined frequency to transfer the same to the wireless power transmission device 200.

The transmission induction coil 210 may be inductively coupled to the transmission resonance coil 220. That is, when an alternating current flows in the transmission induction coil 210 owing to the electric power supplied from the power supply device 100, an alternating current may also be induced in the transmission resonance coil 220, which is physically spaced apart therefrom, by electromagnetic induction.

Subsequently, the electric power transferred to the transmission resonance coil 220 may be transferred to the wireless power reception device 300, which forms a resonance circuit with the wireless power transmission device 200, by resonance.

Electric power may be transmitted between two LC circuits, the impedances of which are matched with each other, by resonance. As such, electric power can be transferred over longer distances at higher efficiency by resonance than by electromagnetic induction.

The reception resonance coil 310 may receive electric power from the transmission resonance coil 220 by resonance. An alternating current may flow in the reception resonance coil 310 due to the received electric power, and the electric power transferred to the reception induction coil 310 may be transferred to the reception induction coil 320 which is inductively coupled to the reception resonance coil 310 by electromagnetic induction. The electric power transferred to the reception induction coil 320 may be rectified through the rectification unit 330 and be transferred to the load 400.

Each of the transmission induction coil 210, the transmission resonance coil 220, the reception resonance coil 310, and the reception induction coil 320 may have either a spiral structure or a helical structure in the embodiment, but the present invention is not limited thereto.

Electric power may be transmitted from the transmission resonance coil 220 of the wireless power transmission device 200 to the reception resonance coil 310 of the wireless power reception device 300 by an electric field.

Specifically, the transmission resonance coil 220 and the reception resonance coil 310 may be coupled by resonance so as to operate at a resonant frequency.

The power transmission efficiency between the wireless power transmission device 200 and the wireless power reception device 300 may be significantly improved by the resonance coupling of the transmission resonance coil 220 and the reception resonance coil 310.

In the embodiment, when the wireless power transmission system performs power transmission on the basis of electromagnetic induction, the wireless power transmission device 200 may not include the transmission resonance coil 220, and the wireless power reception device 300 may not include the reception resonance coil 310.

In the wireless power transmission, a quality factor and a coupling coefficient are meaningful. That is, as the quality factor and the coupling coefficient take greater values, power transmission efficiency can be improved.

The quality factor may mean an index of energy accumulated in the vicinity of the wireless power transmission device 200 or the wireless power reception device 300.

The quality factor may vary according to operating frequency (w), shapes, dimensions, and materials of coils, etc. The quality factor may be indicated by the equation Q=w*L/R. Here, L is an inductance of a coil, and R is a resistance corresponding to a power loss occurring in the coil itself.

The quality factor may have a value of 0 to infinity, and the power transfer efficiency between the wireless power transmission device 200 and the wireless power reception device 300 can be improved as the quality factor is increased.

The coupling coefficient means a level of magnetic coupling between a transmission-side coil and a reception-side coil, and is in a range of 0 to 1.

The coupling coefficient may vary according to relative positions or distances between transmission-side and reception-side coils.

FIG. 2 is a diagram illustrating an equivalent circuit of the transmission induction coil 210 according to the embodiment of the present invention.

As illustrated in FIG. 2, the transmission induction coil 210 may consist of an inductor L1 and a capacitor C1, and may be constituted by a circuit having appropriate inductance and capacitance values by the inductor and the capacitor.

The transmission induction coil 210 may be constituted by an equivalent circuit in which both ends of the inductor L1 are connected to both ends of the capacitor C1. That is, the transmission induction coil 210 may be constituted by an equivalent circuit in which the inductor L1 is connected in parallel to the capacitor C1.

The capacitor C1 may be a variable capacitor, and impedance matching may be performed by adjusting the capacitance of the capacitor C1. The equivalent circuits of the transmission resonance coil 220, the reception resonance coil 310, and the reception induction coil 320 may be similar to that illustrated in FIG. 2.

FIG. 3 is a diagram illustrating equivalent circuits of the power supply device 100 and the wireless power transmission device 200 according to the embodiment of the present invention.

As illustrated in FIG. 3, the transmission induction coil 210 and the transmission resonance coil 220 may consist of inductors L1 and L2 and capacitors C1 and C2 having predetermined inductance values and capacitance values, respectively.

FIG. 4 is a diagram illustrating an equivalent circuit of the wireless power reception device 300 according to the embodiment of the present invention.

As illustrated in FIG. 4, the reception resonance coil 310 and the reception induction coil 320 may consist of inductors L3 and L4 and capacitors C3 and C4 having predetermined inductance values and capacitance values, respectively.

The rectification unit 330 may convert the AC power transferred from the reception induction coil 320 into DC power so as to transfer the converted DC power to the load 400.

Specifically, the rectification unit 330 may include a rectifier and a smoothing circuit.

In the embodiment, the rectifier may be a silicon rectifier, and may be equalized by a diode DI, as illustrated in FIG. 4.

The rectifier may convert the AC power transferred from the reception induction coil 320 into DC power.

The smoothing circuit may remove an AC component included in the DC power converted by the rectifier so as to output smooth DC power. A rectifier capacitor C5 may be used as the smoothing circuit, as illustrated in FIG. 4, in the embodiment, but the present invention is not limited thereto.

The load 400 may be any rechargeable battery or device requiring DC power. For example, the load 400 may mean a battery.

The wireless power reception device 300 may be mounted in electronic devices, such as a mobile phone, a notebook, and a mouse, requiring electric power. Thus, the reception resonance coil 310 and the reception induction coil 320 may have a shape suitable for electronic devices.

The wireless power transmission device 200 may exchange information with the wireless power reception device 300 using in-band communication or out-of-band communication.

The in-band communication may refer to communication used to exchange information between the wireless power transmission device 200 and the wireless power reception device 300 using signals having frequencies used for wireless power transmission. The wireless power reception device 300 may further include a switch, and may receive or not receive electric power transmitted from the wireless power transmission device 200 through the switching operation of the switch. Thus, the wireless power transmission device 200 may recognize an on/off signal of the switch included in the wireless power reception device 300 by detecting an amount of power consumed by the wireless power transmission device 200.

Specifically, the wireless power reception device 300 may use a resistance and a switch to change an amount of power absorbed by the resistance, and may change electric power consumed by the wireless power transmission device 200. The wireless power transmission device 200 may detect a change of the consumed power to acquire state information of the wireless power reception device 300. The switch and the resistance may be connected in series. In the embodiment, the state information of the wireless power reception device 300 may include information about a current charge amount of the wireless power reception device 300 and the progress thereof.

In more detail, when the switch is opened, the amount of power absorbed by the resistance becomes 0, and the electric power consumed by the wireless power transmission device 200 is decreased.

When the switch is short-circuited, the amount of power absorbed by the resistance becomes 0, and the electric power consumed by the wireless power transmission device 200 is increased. When this operation is repeated in the wireless power reception device, the wireless power transmission device 200 may perform digital communication with the wireless power reception device 300 by detecting electric power consumed by the wireless power transmission device 200.

The wireless power transmission device 200 may receive the state information of the wireless power reception device 300 according to the above operation, and may transmit electric power suitable for the same.

In contrast, the wireless power transmission device 200 may include a resistance and a switch in order to transmit state information of the wireless power transmission device 200 to the wireless power reception device 300. In the embodiment, the state information of the wireless power transmission device 200 may include information about a maximum supply amount of power that may be transmitted from the wireless power transmission device 200, the number of wireless power reception devices supplied with electric power from the wireless power transmission device 200, and an available amount of power of the wireless power transmission device 200.

Next, the out-of-band communication will be described.

The out-of-band communication refers to communication used to exchange information required for power transmission using a separate frequency band instead of a resonant frequency band. The wireless power transmission 200 and the wireless power reception device 300 may include out-of-band communication modules to exchange information required for power transmission. Such an out-of-band communication module may also be provided for the power supply device. The out-of-band communication module may use a local area network system such as Bluetooth, Zigbee, wireless LAN, or NFC (Nar Field Communication) in the embodiment, but the present invention is not limited thereto.

Next, the configuration of the power supply device according to the embodiment of the present invention will be described with reference to FIG. 5. The description in FIG. 5 will be given with reference to FIGS. 1 to 4.

FIG. 5 is a diagram illustrating the configuration of the power supply device according to the embodiment of the present invention.

Referring to FIG. 5, the power supply device 100 may include a power supply unit 110, an oscillator 130, a power transmission detection unit 140, an AC power generation unit 150, and a control unit 170.

The power supply device 100 may be included in the wireless power transmission device 200. On the contrary, the power supply device 100 may include the wireless power transmission device 200.

The power supply unit 110 may supply DC power to each component of the power supply device 100.

The power supply device 100 may convert the DC power transferred from the power supply unit 110 into AC power, and supply the same to the wireless power transmission device 200.

In an example, when the wireless power transmission device 200 transmits electric power to the wireless power reception device 200 using resonance, the wireless power transmission device 300 includes the transmission induction coil 210 and the transmission resonance coil 220. However, when the wireless power transmission device 200 transmits electric power to the wireless power reception device 300 using electromagnetic induction, the wireless power transmission device 200 may include only the transmission induction coil 210.

The oscillator 130 may generate an AC signal having a predetermined frequency and output the generated AC signal to the AC power generation unit 150.

In an example, when the wireless power transmission device 200 transmits electric power to the wireless power reception device 200 using resonance, the predetermined frequency may be a resonant frequency. That is, the oscillator 130 may generate an AC signal having a resonant frequency such that the wireless power transmission device 200 and the wireless power reception device 300 may transfer electric power at the resonant frequency, and may output the generated AC signal to the AC power generation unit 15n.

In an example, when the wireless power transmission device 200 transmits electric power to the wireless power reception device 300 using electromagnetic induction, the oscillator 130 may adjust electric power supplied to the wireless power transmission device 200 by regulating a frequency. That is, when the wireless power transmission device 200 is required to decrease or increase electric power transferred to the wireless power reception device 300, the oscillator 130 may generate an AC signal having a regulated frequency and may output the same to the AC power generation unit 150. When the power transmission is performed using electromagnetic induction, the oscillator 130 may adjust electric power supplied to the wireless power transmission device 200 by regulating a frequency, so that the electric power transferred to the wireless power reception device 300 may be adjusted.

The power transmission detection unit 140 may detect a power transmission state between the wireless power transmission device 200 and the wireless power reception device. In the embodiment, the power transmission detection unit 140 may detect the power transmission state to detect a coupling state between the wireless power transmission device 200 and the wireless power reception device. Here, the coupling state may be a state indicative of at least one of the spaced distance between the wireless power transmission device 200 and the wireless power reception device, the positions thereof, and directions thereof.

In the embodiment, the power transmission detection unit 140 may detect a power transmission state through a current flowing in the power supply device 100. To this end, a current sensor may be used. The current sensor may measure a current flowing in the power supply device 100, and the coupling state between the wireless power transmission device 200 and the wireless power reception device may be checked through the measured current. The coupling state may be indicated by a coupling coefficient between the transmission resonance coil 220 of the wireless power transmission device 200 and the reception resonance coil of the wireless power reception device.

The current sensor may detect a current input to the AC power generation unit 150 and may measure an intensity of the detected current. However, the present invention is not limited thereto. For example, the current sensor may measure a current output from the AC power generation unit 150, a current flowing in the power supply device 100, etc.

In addition, a CT (Current Transformer) may be used as the current sensor. The intensity of current measured by the current sensor may vary according to the power transmission state between the wireless power transmission device 200 and the wireless power reception device 300. In the embodiment, the power transmission state may be a state in which power transmission efficiency varies according to changes of the distance between the wireless power transmission device 200 and the wireless power reception device 300 and the directions thereof.

In addition, the intensity of current measured by the current sensor may be associated with a coupling coefficient between the transmission resonance coil 220 of the wireless power transmission device 200 and the reception resonance coil 310 of the wireless power reception device 300. The coupling coefficient means a level of electromagnetic coupling between the transmission resonance coil 220 and the reception resonance coil 310, and is in a range of 0 to 1.

Of course, when the power transmission is performed using electromagnetic induction instead of resonance, the intensity of current measured by the current sensor may be associated with a coupling coefficient between transmission induction coil 210 and the reception induction coil 320.

For example, as the intensity of current applied to the AC power generation unit 150 is increased, the distance between the wireless power transmission device 200 and the wireless power reception device 300 may be decreased. In this case, the coupling coefficient may be increased as the measured intensity of current is increased. On the contrary, as intensity of the current applied to the AC power generation unit 150 is decreased, the distance between the wireless power transmission device 200 and the wireless power reception device 300 may be increased. In this case, the coupling coefficient may be decreased as the measured intensity of current is decreased.

The AC power generation unit 150 may generate AC power by converting the DC power supplied from the power supply unit 110 using the AC signal output from the oscillator 130, and may supply the generated AC power to the wireless power transmission device 200.

The AC power generation unit 150 may amplify the AC signal output from the oscillator 130 and output the same. Since the size of the AC signal output from the oscillator 130 may be small, the AC power generation unit 150 may further include an amplification buffer to amplify the AC signal output from the oscillator 130 by a predetermined size.

The AC power generation unit 150 may have a push-pull type structure. The push-pull type structure refers to a structure in which a pair of switches, transistors, or any circuit blocks is alternately operated such that responses of the two elements alternately occur at the output portions thereof. It is referred to as a push-pull structure since the pair of circuit blocks are alternately operated as if they are pushed and pulled.

The control unit 170 may control the overall operation of the power supply device 100. In particular, when the wireless power transmission device 200 includes two transmission coils, the control unit 170 may select a coil, which serves to transmit electric power to the wireless power reception device 300, from among the two transmission coils, based on the coupling state between the wireless power transmission device 200 and the wireless power reception device 300. The specific operation of the control unit 170 will be described later.

Next, a method of transmitting electric power using a wireless power transmission device according to an embodiment of the present invention will be described with reference to FIGS. 6 to 12.

FIG. 6 is a flowchart illustrating a method of transmitting electric power using a wireless power transmission device according to an embodiment of the present invention. Hereinafter, the method will be given with reference to the description in FIGS. 1 to 5 for explaining FIG. 6, and the power supply device 100 described in FIG. 5 is assumed to be included in the wireless power transmission device 200.

Referring to FIG. 6, the power transmission detection unit 140 of the wireless power transmission device 200 detects a coupling state between the wireless power transmission device 200 and the wireless power reception device 300 (S101). The power transmission detection unit 140 may detect a power transmission state between the wireless power transmission device 200 and the wireless power reception device 300. Specifically, the power transmission detection unit 140 may detects a coupling state between the wireless power transmission device 200 and the wireless power reception device 300 by detecting the power transmission state.

In the embodiment, the coupling state between the wireless power transmission device 200 and the wireless power reception device 300 may refer to a level of magnetic coupling between the wireless power transmission device 200 and the wireless power reception device 300. The coupling state may mean a state that varies according to at least one of the spaced distance between the wireless power transmission device 200 and the wireless power reception device 300, the angles thereof, and positions thereof.

In addition, the coupling state between the wireless power transmission device 200 and the wireless power reception device 300 may be indicated by a coupling coefficient between a transmission coil 230 of the wireless power transmission device 200 and a reception coil 350 of the wireless power reception device 300. In the embodiment, when the coupling coefficient between the transmission coil 230 of the wireless power transmission device 200 and the reception coil 350 of the wireless power reception device 300 is increased, this may mean that the coupling state between the wireless power transmission device 200 and the wireless power reception device 300 is better. When the coupling coefficient between the transmission coil 230 of the wireless power transmission device 200 and the reception coil 350 of the wireless power reception device 300 is decreased, this may mean that the coupling state between the wireless power transmission device 200 and the wireless power reception device 300 is worse.

In the embodiment, the power transmission detection unit 140 may detect a coupling state between the wireless power transmission device 200 and the wireless power reception device 300 through a current flowing in the power supply device 100. To this end, a current sensor may be used. The current sensor may measure a current flowing in the power supply device 100, and the coupling state between the wireless power transmission device 200 and the wireless power reception device 300 may be checked through the measured current. The current sensor may measure a current input to the AC power generation unit 150 or a current output from the AC power generation unit 150.

The intensity of current measured by the current sensor may be proportional to the coupling coefficient between the wireless power transmission device 200 and the wireless power reception device 300. Specifically, as the intensity of current measured by the current sensor is increased, the distance between the wireless power transmission device 200 and the wireless power reception device 300 may be decreased, and thus the coupling coefficient may be increased. On the contrary, as the intensity of current measured by the current sensor is decreased, the distance between the wireless power transmission device 200 and the wireless power reception device 300 may be increased, and thus the coupling coefficient may be decreased.

The control unit 170 determines a transmission coil, which serves to transmit electric power, from among a plurality of transmission coils, based on the detected coupling state (S103). In the embodiment, the wireless power transmission device 200 may include a plurality of transmission coils, and include two transmission coils which are a first transmission coil 270 and a second transmission coil 290.

The control unit 170 of the wireless power transmission device 200 may determine a transmission coil, which allows the coupling state between the wireless power transmission device 200 and the wireless power reception device 300 to be better, from among the two transmission coils, based on the detected coupling state. Steps S101 to S103 will be described with reference to FIGS. 7 to 10.

FIGS. 7 and 8 are diagrams for explaining that the coupling coefficient may vary according to the arrangement between a transmission coil 230 and a reception coil 350. FIGS. 9 and 10 are diagrams for explaining the process of selecting a transmission coil to be enabled by checking the position of the reception coil 350 according to the embodiment of the present invention.

In particular, FIG. 7 is a diagram for explaining, when a wireless power transmission device 200 includes a single transmission coil 230, arrangement between the transmission coil 230 and the reception coil 350. FIG. 7(*a*) illustrates the arrangement between the wireless power transmission device 200 and a terminal 500 when viewed from the top, and FIG. 7(*b*) illustrates the arrangement between the wireless power transmission device 200 and the terminal 500 when viewed from the front.

Referring to FIGS. 7(*a*) and (*b*), the wireless power reception device 300 having the reception coil 350 may be disposed on the wireless power transmission device 200, and the reception coil 350 may receive electric power from the transmission coil 230 of the wireless power transmission device 200 in a wireless manner.

In the embodiment, the reception coil 350 may receive electric power from the transmission coil 230 using electromagnetic induction or using resonance. If the reception coil 350 receives electric power from the transmission coil 230 using resonance, the transmission coil 230 may be the transmission resonance coil 220 described in FIG. 3, and the reception coil 350 may be the reception resonance coil 310 described in FIG. 4. In addition, the wireless power transmission device 200 may further include a transmission induction coil 210, and the wireless power reception device 300 may further include a reception induction coil 320.

The transmission coil 230 may be disposed on a transmission pad 250. The transmission pad 250 may include a magnetic substance and have a square shape, but is not limited thereto.

The reception coil 350 may be disposed in the terminal 500. The terminal 500 may be a mobile terminal such as a mobile phone, a smart phone, a laptop computer, a digital broadcasting terminal, a PDA (Personal Digital Assistant), a PMP (Portable Multimedia Player), or navigation.

The position between the transmission coil 230 and the reception coil 350 may be indicated by a distance f between a center O1 of the circle formed by the transmission coil 230 and a center O3 of the circle formed by the reception coil 350. When the wireless power transmission device 200 is fixedly disposed, the level of magnetic coupling is changed according to a variation in position of the reception coil 350, and thus the coupling coefficient between the transmission coil and the reception coil 350 may vary.

This case will be described with reference to FIG. 8.

FIG. 8 is a diagram illustrating the result of measurement of the coupling coefficient depending on the distance between the center of the transmission coil 230 and the center of the reception coil 350.

The coupling coefficient between the transmission coil 230 and the reception coil 350 is proportional to an amount of magnetic flux, passing through the inside of the reception coil 350, from among the amount of magnetic flux generated in the transmission coil 230. This is because the level of magnetic coupling is increased when the amount of magnetic flux, passing through the inside of the reception coil 350, from among the amount of magnetic flux generated in the transmission coil 230 is increased.

In FIG. 7(*a*), it is assumed that the region, in which the area of the circle formed by the transmission coil 230 overlaps with the area of the circle formed by the reception coil 350, is referred to as a region "A", and the region, in which a portion of the area of the circle formed by the reception coil 350 does not overlap with the area of the circle formed by the transmission coil 230, is referred to as a region "B". As the area of the region "A" is increased, the amount of magnetic flux, passing through the reception coil 350, from among the amount of magnetic flux generated in the transmission coil 230 is increased. Consequently, the coupling coefficient between the transmission coil 230 and the reception coil 350 may be increased. On the contrary, as the area of the region "A" is decreased and the area of the region "B" is increased, the amount of magnetic flux, passing through the reception coil 350, from among the amount of magnetic flux generated in the transmission coil 230 is decreased. Consequently, the coupling coefficient between the transmission coil 230 and the reception coil 350 may be decreased.

That is, as illustrated in FIG. 8, it may be seen that, as the distance between the center of the transmission coil 230 and the center of the reception coil 350 is increased, the coupling coefficient therebetween is decreased. Since the decrease in coupling coefficient means deterioration of power transmission efficiency between the wireless power transmission device 200 and the wireless power reception device 300, it is necessary to increase a coupling coefficient by selectively using two transmission coils even if the distance between the center of the transmission coil 230 and the center of the reception coil 350 is varied.

To this end, the embodiment of the present invention increases a coupling coefficient using two transmission coils even if the position of the reception coil is varied.

FIG. 9 is a diagram illustrating the configuration of a wireless power transmission device provided with two transmission coils according to an embodiment of the present invention.

Referring to FIG. 9, the wireless power transmission device, which is designated by reference numeral 200, may include a transmission pad 250, a first transmission coil 270, and a second transmission coil 290. In addition, the wireless power transmission device 200 may further include the power transmission detection unit 140, the AC power generation unit 150, and the control unit 170 which are the components of the power supply device 100 described in FIG. 5.

The first and second transmission coils 270 and 290 may be disposed on the transmission pad 250. The wireless power transmission device 200 may be fixedly disposed.

Each of the first and second transmission coils 270 and 290 may be one of a helical transmission coil and a spiral transmission coil. In addition, each of the first and second transmission coils 270 and 290 may have a circular shape or a square shape.

The radius of the circle formed by the first transmission coil 270 may be greater than the radius of the circle formed by the second transmission coil 290. Thus the area of the circle formed by the first transmission coil 270 may be greater than the area of the circle formed by the second transmission coil 290. The second transmission coil 290 may be disposed inside the first transmission coil 270.

The first and second transmission coils 270 and 290 may be arranged such that the center of the circle formed by the first transmission coil 270 coincides with the center of the circle formed by the second transmission coil 290, but are not limited thereto. For example, the center of the circle formed by the first transmission coil 270 may not coincide with the center of the circle formed by the second transmission coil 290.

The power transmission detection unit 140 may detect a coupling state between the wireless power transmission device 200 and the wireless power reception device 300 (or the terminal provided with the wireless power reception device 300) which may be disposed on the wireless power transmission device 200.

The control unit 170 may determine a coil, which serves to transmit electric power to the reception coil of the wireless power reception device 300, from among the first and second transmission coils 270 and 290, based on the coupling state detected by the power transmission detection unit 140.

The AC power generation unit 150 may supply AC power to the transmission coil, determined by the control of the control unit 170, from among the first and second transmission coils 270 and 290.

That is, the AC power generation unit 150 may generate AC power using the AC signal applied from the oscillator and the AC power transferred from the power supply unit 110, and may supply the generated AC power to the determined transmission coil.

Hereinafter, the process of determining a transmission coil, which serves to transmit electric power to the wireless power reception device, based on the coupling state detected by the wireless power transmission device 200, will be described with reference to FIGS. 10 to 12.

First, FIG. 10 is a diagram for explaining a variation in coupling coefficient depending on the distance between the centers of the first transmission coil and the reception coil and the distance between the centers of the second transmission coil and the reception coil.

In FIG. 10, the radius of the circle formed by the first transmission coil 270 is 23 mm, and radius of the circle formed by the second transmission coil 290 is 10 mm.

Referring to FIG. 10, K is a graph illustrating a variation in coupling coefficient according to the distance between the center of the circle formed by the first transmission coil 270 and the center of the circle form by the reception coil, and H is a graph illustrating a variation in coupling coefficient according to the distance between the center of the circle formed by the second transmission coil 290 and the center of the circle formed by the reception coil.

The x-axis refers to a distance (unit: mm) between the transmission coil and the reception coil, and the y-axis refers to a coupling coefficient between the transmission coil and the reception coil.

When the distance between the centers of the first and second transmission coils 270 and 290 is in a range of 0 mm to 3 mm, the coupling coefficient when electric power is transmitted through the second transmission coil 290 is greater than that when electric power is transmitted through the first transmission coil 270. Therefore, the second transmission coil 290 may be determined as a coil for power transmission in the wireless power transmission device 200. However, when the coupling coefficient between the first and second transmission coils 270 and 290 is equal to or greater than 0.5, there is no significant difference in power transmission efficiency. Therefore, the first transmission coil 270 may be determined as a coil for power transmission in the wireless power transmission device 200, even when the distance between the centers is in a range of 0 mm to 3 mm.

When the distance between the centers of the first and second transmission coils 270 and 290 is in a range of 3 mm to 16 mm, the coupling coefficient when electric power is transmitted through the first transmission coil 270 is greater than that when electric power is transmitted through the second transmission coil 290. Therefore, the first transmission coil 270 may be determined as a coil for power transmission in the wireless power transmission device 200.

When the distance between the centers of the first and second transmission coils 270 and 290 is in a range that exceeds 16 mm and is less than 30 mm, the coupling coefficient when electric power is transmitted through the second transmission coil 290 is greater than that when electric power is transmitted through the first transmission coil 270. Therefore, the second transmission coil 290 may be determined as a coil for power transmission in the wireless power transmission device 200.

When the distance between the centers of the first and second transmission coils 270 and 290 is in a range of 30 mm to 36 mm, the coupling coefficient when electric power is transmitted through the first transmission coil 270 is greater than that when electric power is transmitted through the second transmission coil 290. Therefore, the first transmission coil 270 may be determined as a coil for power transmission in the wireless power transmission device 200.

In conclusion, in the wireless power transmission device 200 of FIG. 10, electric power may be transmitted to the reception coil through the first transmission coil 270 in a section "C", electric power may be transmitted to the reception coil through the second transmission coil 290 in a section "D", and electric power may be transmitted to the reception coil through the first transmission coil 270 in a section "E".

In an example, the radius of the circle formed by the first transmission coil 270 and the radius of the circle formed by the second transmission coil 290 may be set such that a point I, at which the value of coupling coefficient between the first transmission coil 270 and the reception coil is minimized, coincides with a point J at which the value of coupling coefficient between the second transmission coil 290 and the reception coil is optimized (maximized). In the embodiment of FIG. 10, the above points are points at which the distance between the first transmission coil 270 and the reception coil and the distance between the second transmission coil 290 and the reception coil are 25 mm. The reason is as follows. As the difference between the radius of the circle formed by the first transmission coil 270 and the radius of the circle formed by the second transmission coil 290 is decreased, the graph "H" is close to the graph "K", and thus there is no need to use two transmission coils. In addition, as the difference between the radius of the circle formed by the first transmission coil 270 and the radius of the circle formed by the second transmission coil 290 is increased, the graph "H" is moved in the left direction of the x-axis, and thus the coupling coefficient between the second transmission coil 290 and the reception coil is decreased at the point at which the coupling coefficient between the first transmission coil 290 and the reception coil is minimized.

Similarly, the radius of the circle formed by the second transmission coil 290 may have a certain ratio to the radius of the circle formed by the first transmission coil 270. Specifically, the radius of the circle formed by the second transmission coil 290 may have a ratio of ⅓ to ⅔ of the radius of the circle formed by the first transmission coil 270. The reason is as follows. When there is no difference between the radius of the circle formed by the second transmission coil 290 and the radius of the circle formed by the first transmission coil 270, there is no need to use two transmission coils. In addition, when the difference between the radius of the circle formed by the second transmission coil 290 and the radius of the circle formed by the first transmission coil 270 is too large, the coupling coefficient between the second transmission coil 290 and the reception coil is decreased at the point at which the coupling coefficient between the first transmission coil 290 and the reception coil is minimize.

Although each of the transmission and reception coils has been described as having a circular shape in the embodiment of the present invention, it has various shapes such as a square shape.

The coupling coefficient between the transmission coil and the reception coil may be proportional to the intensity of current measured by the current sensor. Therefore, the coupling coefficient may be increased as the intensity of current measured by the current sensor is increased, and the coupling coefficient may be decreased as the intensity of current measured by the current sensor is decreased.

When using the proportional relation between the coupling coefficient and the measured current, the current measured by the current sensor has a form similar to the graph "K" of FIG. 10 when electric power is transmitted to the reception coil through the first transmission coil 270, and the current measured by the current sensor has a form similar to the graph "H" of FIG. 10 when electric power is transmitted to the reception coil through the second transmission coil 290.

Ultimately, in order to determine a coil, which allows the coupling coefficient to be better, from among the first and second transmission coils 270 and 290, it is necessary to measure a current flowing in the power supply device. This will be described with reference to FIG. 11.

FIG. 11 is a diagram for explaining the process of determining a transmission coil, which serves to transmit electric power to the reception coil, through current measurement, according to an example of the present invention.

Referring to FIG. 11, the power transmission detection unit 140 may include a current sensor, and the AC power generation unit 150 may include a first amplification part 152 and a second amplification part 154.

The current sensor may measure a current applied to the AC power generation unit 150.

The first and second amplification parts 152 and 154 may amplify AC power, which is generated using an AC signal and DC power by the AC power generation unit 150, and may output the amplified AC power.

The control unit 170 may perform the following operation in order to determine a coil, which serves to transmit electric power to the reception coil, from among the first and second transmission coils 270 and 290.

First, the control unit 170 may enable the first amplification part 152, and may disable the second amplification part 154. The first transmission coil 270 may be supplied with AC power through the first amplification part 152 of the AC power generation unit 150 so as to transmit electric power to the reception coil in a wireless manner. In this case, the current sensor may measure an intensity of first current applied to the AC power generation unit 150 and may transfer the measured intensity of first current to the control unit 170.

Subsequently, the control unit 170 may disable the first amplification part 152, and may enable the second amplification part 154. The second transmission coil 290 may be supplied with AC power through the second amplification part 154 of the AC power generation unit 150 so as to transmit electric power to the reception coil in a wireless manner. In this case, the current sensor may measure an intensity of second current applied to the AC power generation unit 150 and may transfer the measured intensity of second current to the control unit 170.

The control unit 170 may determine a coil, which serves to transmit electric power to the reception coil, from among the first and second transmission coils 270 and 290, using the measured intensities of the first and second currents. As described in FIG. 10, FIG. 10 illustrates the relation of the coupling coefficient according to the distance between the centers. Since the coupling coefficient is proportional to the intensity of current, the control unit 170 may compare an intensity of first current with an intensity of second current, and may determine the transmission coil, having the higher intensity of current, as a coil for power transmission. That is, this means that the intensity of first current is compared with the intensity of second current, and the transmission coil having the higher intensity of current allows the coupling coefficient to be better.

Next, FIG. 12 is a diagram for explaining a process of determining a transmission coil, which serves to transmit electric power to the reception coil, through current measurement, according to an alternative example of the present invention.

Referring to FIG. 12, the wireless power transmission device 200 may further include a switch unit 180.

The switch unit 180 may include a first switch 181 and a second switch 183.

The power transmission detection unit 140 may include a current sensor, and the AC power generation unit 150 may include a single amplification part 157.

The current sensor may measure a current applied to the AC power generation unit 150.

The amplification part 157 may amplify AC power, which is generated using an AC signal and DC power by the AC power generation unit 150, and may output the amplified AC power.

The control unit 170 may perform the following operation in order to determine a coil, which serves to transmit electric power to the reception coil, from among the first and second transmission coils 270 and 290.

First, the control unit 170 may short-circuit the first switch 181, and may open the second switch 183. The first transmission coil 270 may be supplied with AC power through the amplification part 157 so as to transmit electric power to the reception coil in a wireless manner. In this case, the current sensor may measure an intensity of first current applied to the AC power generation unit 150 and may transfer the measured intensity of first current to the control unit 170.

Subsequently, the control unit 170 may open the first switch 181, and may short-circuit the second switch 183. The second transmission coil 290 may be supplied with AC power through the amplification part 157 so as to transmit electric power to the reception coil in a wireless manner. In this case, the current sensor may measure an intensity of second current applied to the AC power generation unit 150 and may transfer the measured intensity of second current to the control unit 170.

The control unit 170 may determine a coil, which serves to transmit electric power to the reception coil, from among the first and second transmission coils 270 and 290, using the measured intensities of the first and second currents. As described in FIG. 10, FIG. 10 illustrates the relation of the coupling coefficient according to the distance between the centers. Since the coupling coefficient is proportional to the intensity of current, the control unit 170 may compare an intensity of first current with an intensity of second current, and may determine the transmission coil, having the higher intensity of current, as a coil for power transmission. That is, this means that the intensity of first current is compared with the intensity of second current, and the transmission coil having the higher intensity of current allows the coupling coefficient to be better.

In accordance with the embodiment of the present invention, the wireless power transmission device 200 may transmit electric power to the reception coil through the transmission coil, which the coupling coefficient to be better, from among the first and second transmission coils 270 and 290, even if the position of the reception coil is varied. Therefore, power transmission efficiency can be maximized. In addition, the region in which power transmission is not smoothly performed can be minimized, and the charge region of the wireless power reception device can be extended.

The process will be described with reference to FIG. 6 again.

The wireless power transmission device 200 transmits electric power to the reception coil 350 of the wireless power reception device through the enabled transmission coil 230 (S105).

Subsequently, the processes in steps S101 to S105 may be repeated in the wireless power transmission device 200, In accordance with the embodiment of the present invention, the wireless power transmission device 200 may transmit electric power to the reception coil through the transmission coil, which allows the coupling coefficient to be better, from among the first and second transmission coils 270 and 290, even if the position of the reception coil is varied. Therefore, power transmission efficiency can be maximized. In addition, the region in which power transmission is not smoothly performed can be minimized, and the charge region of the wireless power reception device can be extended.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The wireless power reception device 300 according to the embodiment of the present invention may be mounted to mobile terminals such as mobile phones, smart phones, laptop computers, digital broadcasting terminals, PDAs (Personal Digital Assistants), PMPs (Portable Multimedia Players), and navigation.

However, it will be apparent to those skilled in the art that the configuration according to the embodiment of the present invention may be applied to fixed terminals such as digital TVs and desktop computers, as well as the mobile terminals.

In the present invention, the method of transmitting electric power using electromagnetic induction may mean a tightly coupling method since the Q value is relatively low, and the method of transmitting electric power using resonance may mean a loosely coupling method since the Q value is relatively high.

INDUSTRIAL APPLICABILITY

The present invention is applicable to devices for transmitting and receiving electric power in a wireless manner.

The invention claimed is:

1. A wireless power transmission device for transmitting electric power to a wireless power reception device in a wireless manner, comprising:
   a first transmission coil configured to transmit electric power to the wireless power reception device through a magnetic field; and
   a second transmission coil configured to transmit electric power to the wireless power reception device through a magnetic field, and disposed inside the first transmission coil, wherein the wireless power transmission device transmits electric power to the wireless power reception device though one of the first and second transmission coils, based on a coupling state between the wireless power transmission device and the wireless power reception device,
   wherein the coupling state is indicated by a coupling coefficient between the first transmission coil and a reception coil provided in the wireless power reception device, or a coupling coefficient between the second transmission coil and a reception coil provided in the wireless power reception device, and
   wherein sizes of the first and second transmission coils are set such that a point, at which the coupling coefficient between the first transmission coil and the reception coil of the wireless power reception device is minimized, coincides with a point at which the coupling coefficient between the second transmission coil and the reception coil is maximized.

2. The wireless power transmission device according to claim 1, wherein the wireless power transmission device compares magnetic coupling between the first transmission coil and a reception coil provided in the wireless power reception device with magnetic coupling between the second transmission coil and the reception coil, so as to transmit electric power to the wireless power reception device through a coil for allowing the magnetic coupling to be better.

3. The wireless power transmission device according to claim 2, further comprising a power transmission detection unit configured to detect a coupling state between the wireless power transmission device and the wireless power reception device,
   wherein the power transmission detection unit measures a current flowing in the wireless power transmission device to check the coupling state.

4. The wireless power transmission device according to claim 3, wherein the wireless power transmission device alternately operates the first and second transmission coils to measure the current flowing in the wireless power transmission device.

5. The wireless power transmission device according to claim 4, wherein the wireless power transmission device transmits electric power to the wireless power reception device through a coil, in which the measured current has a higher intensity, from among the first and second transmission coils.

6. The wireless power transmission device according to claim 4, further comprising an AC power generation unit configured to generate AC power using an AC signal and DC power,
   wherein the AC power generation unit comprises a first amplification part for outputting the generated AC power to the first transmission coil, and a second amplification part for outputting the generated AC power to the second transmission coil.

7. The wireless power transmission device according to claim 6, wherein the wireless power transmission device compares a current measured when the first amplification part is enabled and the second amplification part is disabled, with a current measured when the first amplification part is disabled and the second amplification part is enabled, in order to determine one of the first and second transmission coils as a coil for power transmission.

\* \* \* \* \*